United States Patent Office 2,719,850
Patented Oct. 4, 1955

2,719,850

BASICALLY SUBSTITUTED 9-CARBAZOLE-CARBOXAMIDES

John W. Cusic, Skokie, Ill., assignor to G. D. Searle & Co., Chicago, Ill., a corporation of Illinois No Drawing. Application September 21, 1953,
Serial No. 381,477

9 Claims. (Cl. 260—315)

The present invention relates to a new group of basically substituted 9-carbazolecarboxamides and, more particularly, to the compounds of the general structural formula

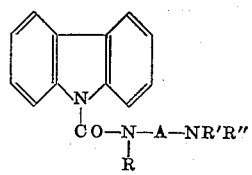

and the non-toxic salts thereof, wherein A is a lower bivalent, aliphatic hydrocarbon radical, R is a member of the class consisting of lower cycloalkyl, lower aralkyl, and lower aryl hydrocarbon radicals and R' and R" are lower alkyl radicals. In the foregoing structural formula the cyclic radical R can represent such lower cycloalkyl groups as cyclopropyl, cyclobutyl, cyclopentyl, and cyclohexyl. The radical R can also represent a lower aromatic hydrocarbon radical such as a phenyl radical or a lower alkylated phenyl radical such as tolyl, xylyl, cumyl, and diethylphenyl as well as an aralkyl radical such as benzyl, phenethyl, phenylpropyl, phenylbutyl, phenylpentyl, phenylhexyl, tolylmethyl, xylylethyl, and the like.

Among the radicals which R' and R" may represent are straight and branch chained lower alkyl groups such as methyl, ethyl, propyl, butyl, amyl and hexyl. The radical NR'R" can also be a saturated nitrogen-containing heteromonocyclic group attached to the radical A through a nitrogen in the heteromonocycle; examples for such heteromonocylic radicals are N-pyrrolidino, N-piperidino, N-lupetidino, N-morpholino, N-thiamorpholino, N'-alkyl-N-piperazino and like radicals.

The radical A is a lower alkylene radical. This radical is derived from a straight chain or branched chain hydrocarbon such as ethylene, propylene, butylene, amylene, hexylene or a polymethylene radical such as trimethylene, tetramethylene, pentamethylene, and hexamethylene.

The organic bases of the foregoing type form salts which are non-toxic in therapeutic dosage with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide new chemical substances of the type indicated above. These new substances possess a number of highly useful therapeutic properties. The bases and their simple acid addition salts provide valuable renal excretory and cardiovascular drugs, and particularly agents which regulate abnormal heart action. The quaternary ammonium salts are also active in reducing blood pressure and in blocking the transmission of nerve impulses through the overstimulated sympathetic and parasympathetic nervous system.

The following examples illustrate in detail certain of the compounds which comprise this invention and methods for producing same. However, this invention is not to be construed as limited in spirit or in scope thereby. It will be apparent to those skilled in the art that many modifications in materials and methods may be made without departing from the invention. In each of these examples, temperatures are given in degrees centigrade (° C.) and relative amounts of materials in parts by weight.

EXAMPLE 1

*N-(β-dimethylaminoethyl) - N - cyclohexyl-9-carbazolecarboxamide*

Upon mixing of 85 parts of freshly distilled N-dimethylaminoethylhexahydroaniline and 114 parts of 9-carbazolecarbonyl chloride in 600 parts of butanone, a precipitate forms most of which dissolves while the reaction mixture is heated at reflux temperature for 90 minutes. A small amount of precipitate is removed by filtration and the filtrate is cooled. After standing for 2 hours at 0° C. the heavy precipitate is collected on a filter. The hydrochloride of N-(β-dimethylaminoethyl) - N - cyclohexyl-9-carbazolecarboxamide thus obtained melts at about 117–120° C. It has the structural formula

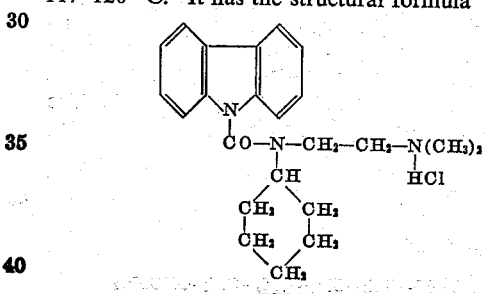

EXAMPLE 2

*N-(β-diisopropylaminoethyl) - N - cyclopentyl-9-carbazolecarboxamide*

A mixture of 212 parts of β-diisopropylaminoethylcyclopentylamine and 230 parts of 9-carbazolecarbonyl chloride in 1600 parts of butanone is heated at reflux temperature for 3 hours and then filtered while hot. The filtrate is treated with ice and dilute hydrochloric acid. The aqueous layer is washed with ether, rendered alkaline by addition of potassium hydroxide and extracted with ether. This extract is dried over anhydrous magnesium carbonate, filtered and evaporated to yield N-(β-diisopropylaminoethyl)-N-cyclopentyl - 9 - carbazolecarboxamide as a high-boiling, yellow oil which has the structural formula

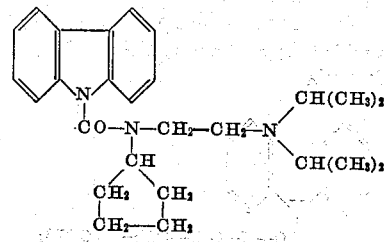

EXAMPLE 3

*N-(β-diethylaminoethyl)-9-carbazolecarboxanilide*

Upon mixing of 192 parts of β-diethylaminoethylaniline and 310 parts of 9-carbazolecarbonyl chloride in 800 parts of butanone, a vigorous reaction occurs which is completed by heating at reflux temperature for 4 hours. On cooling, a crystalline precipitate is formed which is collected on a filter, dissolved in warm water and treated with a small excess of dilute aqueous sodium hydroxide. A heavy oil forms which is separated and dissolved in butanone. This solution is treated with one equivalent of a 25% solution of anhydrous hydrogen chloride in isopropanol. Addition of a small quantity of ether causes formation of a heavy precipitate which is collected on a filter and recrystallized from isopropanol. The hydrochloride of the N-(β-diethylaminoethyl)-9-carbazolecarboxanilide thus obtained melts at about 207–208° C. It has the structural formula

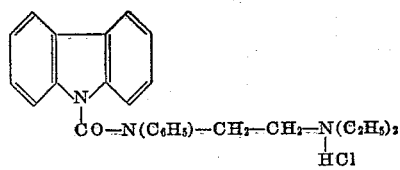

EXAMPLE 4

*N-(γ-dimethylaminobutyl)-N-(3,4-xylyl)-9-carbazole-carboxamide*

To a solution of 230 parts of 9-carbazolecarbonyl chloride in 800 parts of butanone, 205 parts of dimethylaminobutyl-3,4-xylylamine are added. After subsidence of the initial reaction, the mixture is heated at reflux temperature for 5 hours and cooled. The precipitate is collected on a filter and dissolved in dilute hydrochloric acid. This solution is washed with ether and rendered alkaline by addition of dilute sodium hydroxide whereupon the N-(γ-dimethylaminopropyl)-N-(3,4-xylyl)-9-carbazolecarboxamide precipitates as a high-boiling, heavy orange oil. The compound has the structural formula

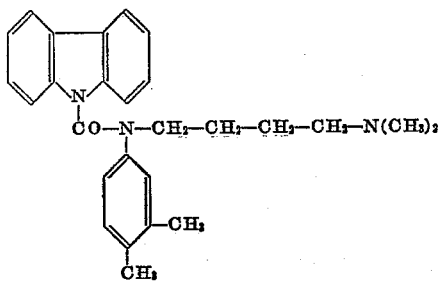

EXAMPLE 5

*N-(β-diethylaminoethyl)-N-benzyl-9-carbazole-carboxamide*

A mixture of 114 parts of 9-carbazolecarbonyl chloride and 103 parts of N-(β-diethylaminoethyl)benzylamine in 800 parts of butanone is heated at reflux temperature for 4 hours and then permitted to stand at room temperature for 10 hours. Upon chilling, the hydrochloride of N-(β-diethylaminoethyl)-N-benzyl-9-carbazolecarboxamide precipitates which melts at about 205–206° C. In has the structural formula

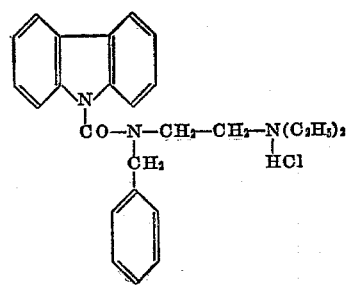

EXAMPLE 6

*N-(β-diethylaminoethyl)-N-(α-phenethyl)-9-carbazole-carboxamide*

A mixture of 114 parts of 9-carbazolecarbonyl chloride and 110 parts of β-diethylaminoethyl-α-phenethylamine in 800 parts of butanone is heated at reflux temperature for 3 hours and then cooled. The precipitated hydrochloride of N-(β-diethylaminoethyl)-N-(α-phenethyl)-9-carbazolecarboxamide is recrystallized from dilute isopropanol. It melts at about 211–212° C. This salt has the structural formula

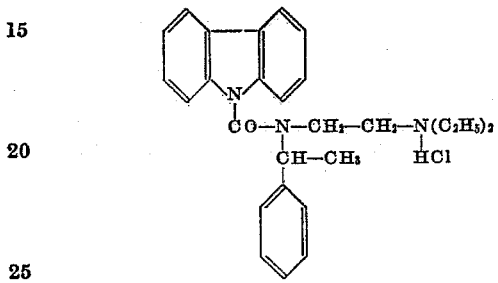

I claim:
1. A compound of the structural formula

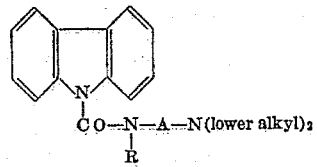

wherein A is a lower alkylene radical separating the two nitrogen atoms attached thereto by at least two carbon atoms and R is a member of the class consisting of cyclopentyl, cyclohexyl, phenyl, phenyl substituted lower alkyl, and lower alkyl substituted phenyl radicals.

2. A compound of the structural formula

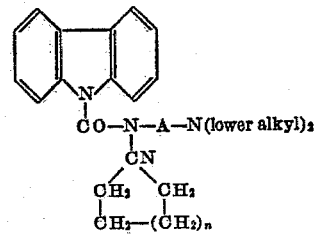

wherein A is a lower alkylene radical separating the two nitrogen atoms attached thereto by at least two carbon atoms and $n$ is a positive integer smaller than three.

3. A compound of the structural formula

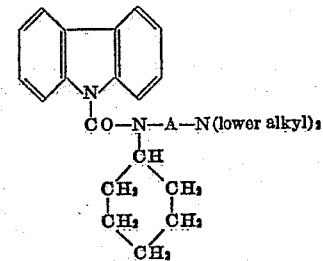

wherein A is a lower alkylene radical separating the two nitrogen atoms attached thereto by at least two carbon atoms.

4. N-(β-dimethylaminoethyl)-N-cyclohexyl-9-carbazolecarboxamide.

5. A 9-carbazolecarboxanilide of the structural formula

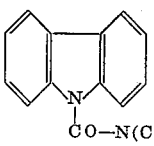
$$CO-N(C_6H_5)-A-N(lower\ alkyl)_2$$

wherein A is a lower alkylene radical separating the two nitrogen atoms attached thereto by at least two carbon atoms.

6. N-($\beta$-diethylaminoethyl)-9-carbazolecarboxanilide.
7. A compound of the structural formula

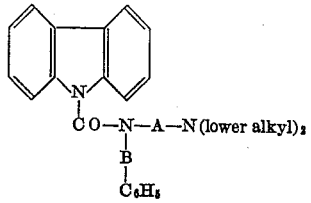

wherein A is a lower alkylene radical separating the two nitrogen atoms attached thereto by at least two carbon atoms and B is a lower alkylene radical.

8. N-($\beta$-diethylaminoethyl)-N-benzyl-9-carbazolecarboxamide.
9. N-($\beta$-diethylaminoethyl)-N-$\alpha$-phenethyl-9-carbazolecarboxamide.

References Cited in the file of this patent

UNITED STATES PATENTS

| | | |
|---|---|---|
| 2,089,985 | Ruigh | Aug. 17, 1937 |
| 2,576,106 | Cusic | Nov. 27, 1951 |